United States Patent [19]

Carter et al.

[11] 4,107,795
[45] Aug. 22, 1978

[54] SELF-CONTAINED COMFORT STATION

[75] Inventors: William Edward Carter, Piedmont, S.C.; Italo Americo Cosentino, Huntingdon Valley, Pa.

[73] Assignee: Modular Conceptual Systems, Inc., Ivyland, Pa.; by said William E. Carter

[21] Appl. No.: 605,285

[22] Filed: Aug. 18, 1975

[51] Int. Cl.² .................. E03D 5/016; B01D 1/16; B60R 15/04
[52] U.S. Cl. ........................ 4/313; 159/4 F; 210/152; 210/181; 210/195 R; 236/44 B; 4/322; 4/408; 4/342
[58] Field of Search .............. 4/10, 11, 12, 82, 89, 4/92, 96, 111, 115, 116, DIG. 12, 1, 76–80; 210/152, 195, 14, 109, 181; 236/44 B; 62/310, 314, 331; 261/105, 6; 52/34, 35; 159/3, 4 R, 4 F

[56] References Cited

U.S. PATENT DOCUMENTS

| | | | |
|---|---|---|---|
| 2,146,127 | 2/1939 | Miller | 236/44 B |
| 2,798,228 | 7/1957 | Boester | 210/152 X |
| 2,817,091 | 12/1957 | Painter | 4/11 X |
| 2,817,846 | 12/1957 | Stift | 4/1 |
| 3,005,205 | 10/1961 | Breen | 4/1 |
| 3,042,383 | 7/1962 | Pennington | 62/314 X |
| 3,118,187 | 1/1964 | Alimanestiano | 52/34 |
| 3,567,629 | 3/1971 | Ayers | 210/14 |
| 3,568,215 | 3/1971 | Riedel et al. | 4/10 |
| 3,624,664 | 11/1971 | Klingle | 4/DIG. 12 |
| 3,700,565 | 10/1972 | Cornish et al. | 4/78 X |
| 3,747,362 | 7/1973 | Mercer | 62/310 X |
| 3,769,637 | 11/1973 | Llames | 4/82 X |
| 3,776,383 | 12/1973 | Hargraves | 4/DIG. 12 |
| 3,824,632 | 7/1974 | Bach et al. | 4/115 X |
| 3,825,119 | 7/1974 | Rost | 210/150 X |
| 3,839,745 | 10/1974 | Bramall | 4/11 |
| 3,840,907 | 10/1974 | Sundberg | 4/DIG. 12 |
| 3,856,672 | 12/1974 | Boswinkle et al. | 210/181 X |
| 3,873,445 | 3/1975 | Bussard | 210/181 X |
| 3,879,768 | 4/1975 | Murphy | 4/1 |
| 3,974,075 | 8/1976 | Saigh et al. | 210/181 X |

*Primary Examiner*—Richard E. Aegerter
*Assistant Examiner*—Stuart S. Levy
*Attorney, Agent, or Firm*—John W. Logan, Jr.

[57] ABSTRACT

The preferred embodiment of the invention disclosed in this application includes a building module having at least one compartment therein in which is contained a toilet system for bacteriologically breaking down solid waste and paper to provide a relatively pure liquid effluent. The toilet communicates with a flush tank into which the effluent is discharged and which communicates with a pump for pumping the effluent to an evaporator for removing excess effluent from the toilet system. Preferably the evaporator utilizes the effluent as a heat exchange medium for heating or cooling air discharged to each toilet compartment which air is circulated back to the atmosphere through a vent opening to help remove odors from the compartment. The evaporator may be arranged to aerate the effluent which is then discharged back to the flush tank so that it can be used to flush the toilet and enhance the biological breakdown of waste.

16 Claims, 3 Drawing Figures

SELF-CONTAINED COMFORT STATION

This invention relates to a self-contained comfort station and, more particularly, to a self-contained comfort station including apparatus for removing excess effluent therefrom and for conditioning the air therein.

Public comfort stations of the type adapted to be used at job sites, parks, camps, playgrounds, rest areas and other public facilities may be permanently installed or portable depending on the usage requirements of the facility and, accordingly, the system. Permanently installed comfort stations include toilets connected to a municipal sewage system or to septic tanks buried in the ground. Toilets that are connected to a municipal sewage system are relatively expensive to install and operate and, in addition, since public comfort stations may be used only at certain peak times, for example, only when the facility is used, can overload municipal sewage systems during such peak times or require the overdesign of a municipal sewage system to accomodate the loads imposed on it at peak times. Toilets connected to septic tanks work in a satisfactory manner only if the tank is buried in ground permeable enough to soak up the effluent discharged by the tank. It has been found that less than half the land in the United States is suitable for septic tanks because most of the land is composed of impermeable clay.

One solution to the problems noted above would be to replace the permanently installed comfort stations with the portable type. However, portable comfort stations also have problems associated with their usage that need be overcome before they are entirely satisfactory for either permanent or temporary use. Most of the commonly used portable comfort stations include toilets that discharge waste into a holding tank in which it is stored for later removal. Removal of the waste presents scheduling problems because the removal should be correlated with usage of the toilets. After it is removed, the waste should be dumped into approved areas, but it has been found that a significant amount of the waste is being dumped onto unapproved sites creating various environmental problems. Finally, other problems associated with portable comfort stations, whether permanently or temporarily installed, relate to the fact that they are generally not heated or cooled and that they are not usually vented to remove odors in a satisfactory manner. Accordingly, these comfort stations may be too hot or too cold and may have obnoxious odors associated therewith.

Accordingly, it is an object of this invention to provide a self-contained comfort station requiring no connections to water or sewer lines and which is adapted to be permanently or temporarily installed.

It is another object of this invention to provide a self-contained comfort station that is heated or cooled in an economical manner depending on the outside temperature.

It is yet another object of this invention to provide a self-contained comfort station that is relatively odor-free.

Finally, it is an object of this invention to provide a self-contained comfort station that is relatively economical to build and operate, easily transportable, requires no external connections and which has a controlled and relatively odor-free environment.

These and other objects of this invention are accomplished by providing a building module including at least one compartment in which is contained a toilet system for breaking down solid waste and paper to provide a relatively clean liquid effluent. The toilet communicates with a flush tank into which the effluent is discharged and which is associated with a pump operative to pump the effluent to an evaporator for removing excess effluent. Preferably the evaporator utilizes the effluent as a heat exchange medium for heating or cooling air which is discharged into each compartment. A vent is preferably provided in the toilet compartment so that the air discharged thereto flows to the atmosphere facilitating the removal of odors. Preferably, the evaporator discharges aerated effluent back to the flush tank and the pump is also operative to pump the effluent through the toilet system to flush it. Thus if the toilet system utilizes a bacteriological process for the elimination of waste, as is also preferred, the aeration enhances this process.

For a better understanding of the invention, reference is made to the following description of a preferred embodiment thereof, taken in conjunction with the figures of the accompanying drawing, in which.

Figure 1:
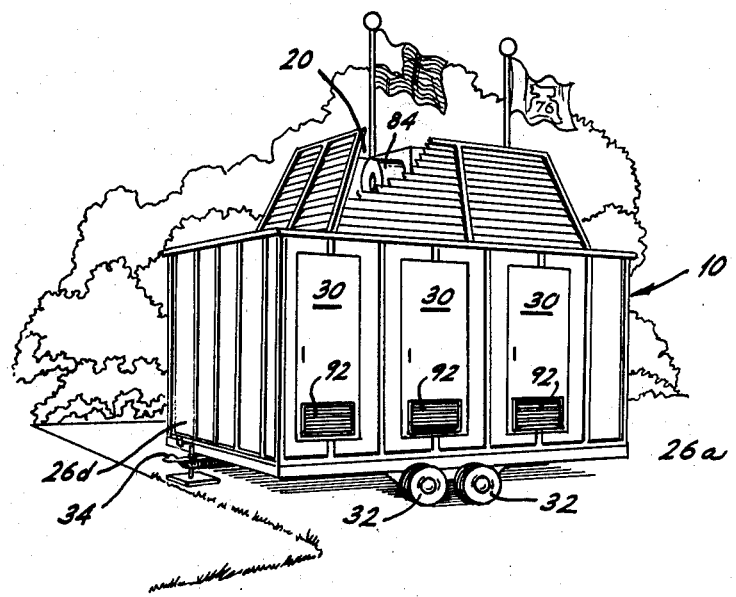
FIG. 1 is a perspective view of a self-contained comfort station in accordance with this invention with portions thereof broken away.

Referring to the drawings, a preferred embodiment of this invention is disclosed and comprises a building module 10 including at least one and preferably a plurality of toilet compartments 12 each including a toilet 14 which is capable of completely breaking down solid waste and paper and provides a relatively pure liquid effluent which is discharged to a flush tank 16. Associated with the flush tank 16 is a generally conventional pump 18 for pumping the liquid effluent from the flush tank to an evaporator system 20 using the effluent as a heat exchange medium for air and for discharging conditioned air, either heated or cooled, to the toilet compartments. Each compartment includes a vent so that the conditioned air flows to the atmosphere helping to eliminate odors therein. The excess effluent from the evaporator system 20 is returned to the flush tank 16 and, as will be explained hereinafter, the returned effluent has been aerated by the system 20 and is displaced by the pump 18 to the toilets 14 to flush the toilets. Thus the aerated effluent will enhance the biological breakdown of waste in the toilet preferred for use with this invention.

Figure 2:
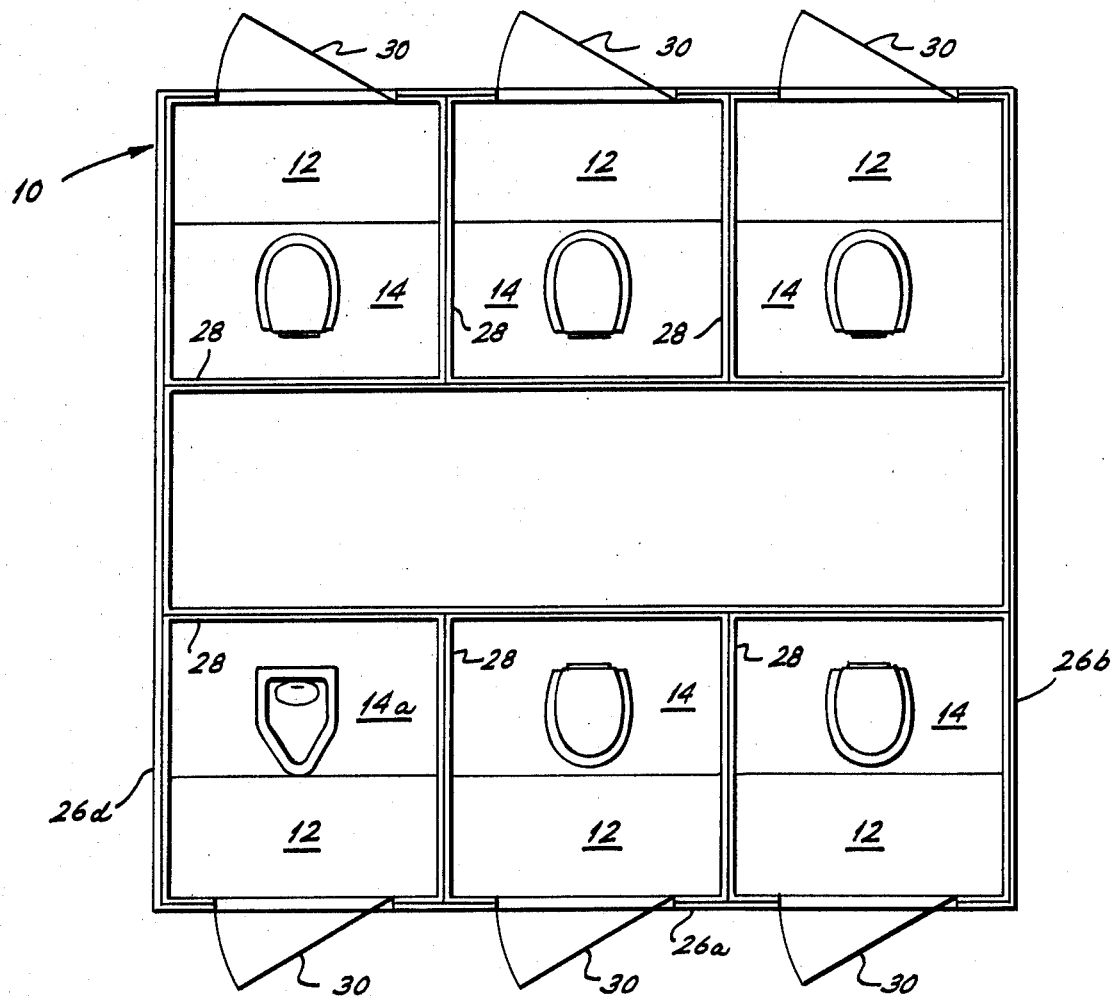
FIG. 2 is a plan view of the comfort station illustrated in FIG. 1 and looking generally along the line 2—2 thereof; and, FIG. 3 is an end view of the comfort station illustrated in FIG. 1 looking generally along the line 3—3 and having certain portions thereof shown schematically and arranged for the sake of clarity.
Figure 3:
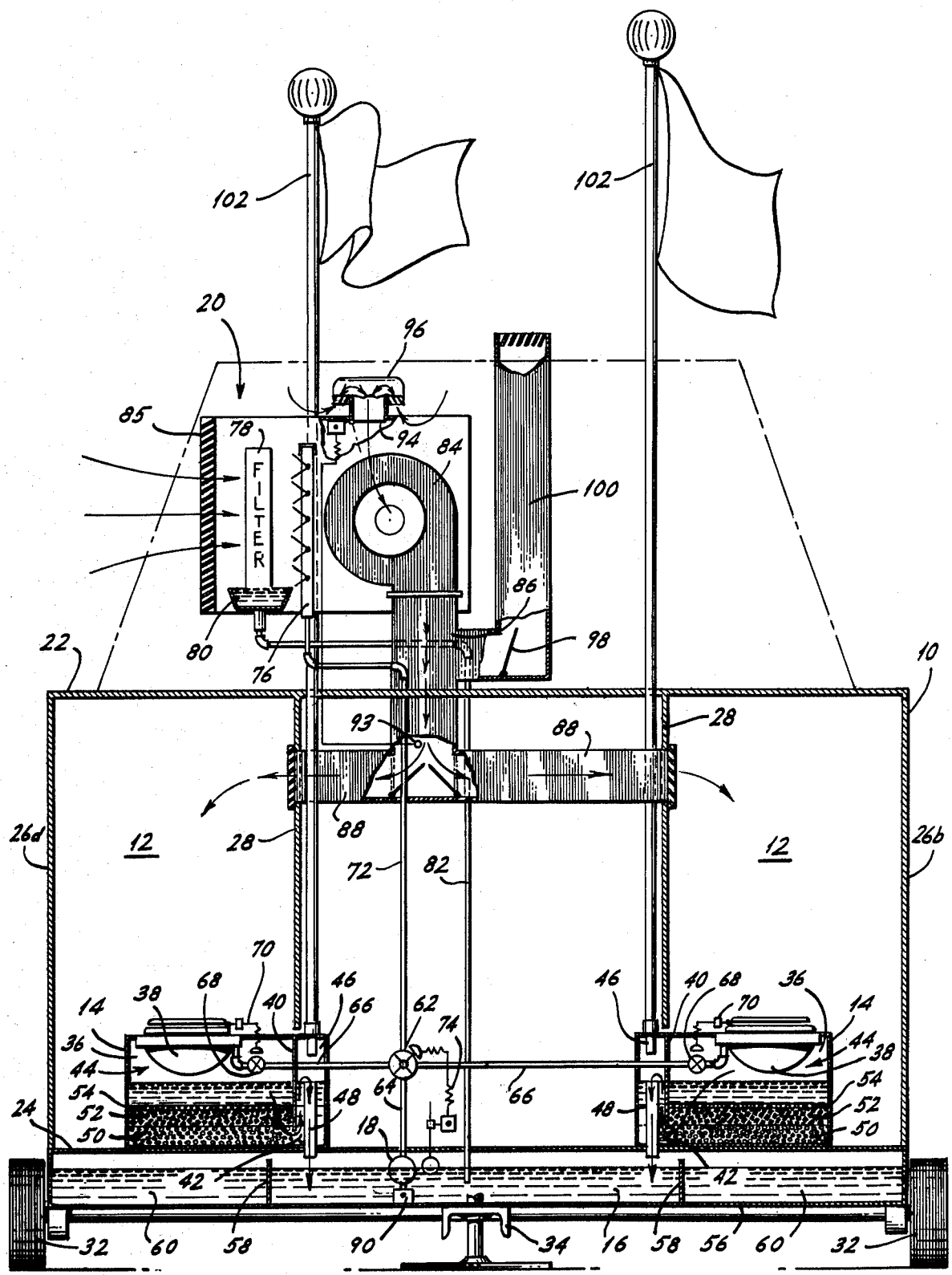

Referring particularly to FIGS. 1 and 2 of the drawing, it can be seen that the building module 10 includes a roof 22, a floor 24 and exterior walls 26a, 26b, 26c and 26d. Inside the module are a plurality of partition walls 28 arranged to provide individual toilet compartments 12, each of which is provided with a door 30 opening to the outside. The toilet compartments 12 are arranged to provide a central compartment 29 for storage and providing access to various of the apparatus utilized in accordance with this invention. While the preferred embodiment discloses individual toilet compartments, it should be understood that module 10 can be provided with two compartments each including a plurality of toilets 14 and that one compartment can function as a facility for men and the other for women. Further, it should also be understood that module 10 could be provided with no interior portions so that a single compartment is formed with a single or a plurality of toilets 14 to function as a facility for men or women. In most embodiments of the invention, it is preferable to have the module 10 easily transportable and, thus the module may be mounted on a chassis including wheels 32 and a hitch structure 34 both of which are generally conventional and need not be explained here in further detail. Alternatively, the module 10 could rest directly on the ground for more permanent installations and may be provided with rings or other arrangements adapted to cooperate with a hoist so that the module can be transported.

As noted previously, each toilet compartment 12 includes a toilet 14 which is arranged to break down waste and paper so as to provide a relatively pure liquid effluent. Preferably, the toilet 14 operates in accordance with a biological process, either aerobic, anaerobic or a combination of both to digest the waste and render it inert. While various such toilets can be utilized, a preferred toilet particularly useful with this invention is disclosed herein and generally operates in accordance with some of the principles disclosed in U.S. Pat. to Bach et al, No. 3,824,632, on July 23, 1974. Each toilet 14 includes a tank 36 including a bowl 38 communicating between the top surface of and the interior of the tank. A toilet seat of any conventional construction is mounted on the top surface of the tank 36 around the bowl 38. A wall 40 extends downwardly from the top of the tank 10 toward the bottom and is spaced from the bottom to form a passage 42 communicating between a first digestion tank 44 on one side of the wall and a second digestion tank 46 on the other side of the wall. An overflow pipe 48 extends downwardly from the second digestion tank through the tank 36 and floor 24 of the module 10 into the flush tank 16 which is located below the floor of the module as will be explained hereinafter. The overflow pipe 48 controls the liquid level in the tank.

A layer of gravel 50 extends across the bottom of both of the digestion tanks 44 and 46 and is located beneath a layer of activated charcoal 52 held in place by another layer of gravel 54. The gravel and charcoal act as filtering mediums for the waste and flush water deposited in the digestion tanks. In addition to the filtering action, a biological action occurs in the digestion tanks 44 and 46 to break down wastes and paper. To facilitate the biological action a suitable powder or tablet containing aerobic and/or anaerobic bacteria and enzymes is placed in the digestion tank 48. The bacteria and enzymes consume the waste and paper, respectively, deposited in the digestion tank so that the effluent discharged through the overflow pipe 48 to the flush tank 16 is a relatively pure, odor-free water. Suitable powders or tablets can be purchased from Pure Way Corporation of East Moline, Illinois. At this point it is noted that toilet 14 can be in the form of a urinal 14a illustrated in one of the toilet compartments 12. The urinal would be merely a change in configuration and would discharge into a tank including first and second digestion tanks similar to 44 and 46 and the second digestion tank would communicate with the flush tank 16.

Beneath the floor 24 of the module 10 is located a tank 56 extending throughout substantially the entire area of the floor and which is formed with a pair of walls 58, 58, extending upwardly from the bottom of the tank toward the top. The tank 56 can be an integral structure, and the top can form the floor 24 of the module 10. The walls 58, 58 are spaced from the top of the tank and form the flush tank 16 and a pair of secondary storage tanks 60, 60, the latter being in communication with the former. The flush tank 16 extends throughout the length of the module and is generally centrally disposed so that it provides a common tank receiving discharge from all of the toilets 14. In the event that the toilets experience excessive usage causing the flush tank 16 to overload, the secondary storage tanks 60, 60 will receive overflow from the flush tank and will hold the effluent until it can be pumped out at some later date. It should be noted, however, that the effluent in the secondary storage tanks will be relatively pure having experienced the filtering and biological action in the digestion tanks 44 and 46.

Inside the flush tank 16 is located the pump 18 which can be any conventional, immersible pump for pumping the liquid effluent through a pipe to a main control valve 62. The main control valve 62 is operative to allow the passage of the liquid effluent through a main pipe 64 communicating with branch pipes 66 each of which discharges to the top of the bowl 38 of an associated toilet 14 to provide for flushing of the toilets. Each branch pipe 66 includes a second control valve 68 operative to allow or prevent the passage of the effluent to the bowl 38 and which is actuated by a switch 70 responsive to movement of the toilet seats of the associated toilet. The switch 70 and valve 68 are arranged such that the flush process is essentially continuous and is interrupted only when the toilet system 14 is in use. This may be accomplished in any of a variety of ways, for example, the switch 70 can sense the weight of a user of the toilet to close the valve 68 and can sense the absence of the weight to open the control valve 68 and permit the flushing process. It is contemplated that the user of the toilet system will merely lift the toilet seat to flush the toilet or, if desired, the toilet seat may include a light spring mechanism urging the seat upwardly when the toilet is not in use. This movement of the seat will be sufficient to actuate the control valve 68. If the toilet is the urinal 14a in which case no toilet seat is provided, the flushing process can be continuous or intermittent. If it is desired to have intermittent flushing process, the switch 70 will be replaced with a conventional flush handle to actuate the control valve 68 when it is desired to flush the toilet.

A second pipe 72 communicates with the main control valve 62 and the evaporator system 20 which can be conveniently located on the roof 22 of the module 10. Effluent flow through the valve 62 and pipe 72 can be controlled by a float valve arrangement 74 located in the flush tank 16. By utilizing the float valve arrangement 74 the conditioning of the air discharged to the toilet compartments will not occur unless sufficient effluent is present in the flush tank to accomplish both the flushing and the conditioning processes. The evaporator system 20 includes a header 76 located at the end of the pipe 72 and formed with a series of small openings for spraying the effluent onto a filter pad 78 carried in a trough 80. The effluent not used in the heat exchange process, usually about two-thirds, is discharged into the trough 80 which is connected to a pipe 82 communicating with the flush tank 16 so that the unused effluent is returned for recirculation by the pump 18. A blower 84 is located with an air intake adjacent the filter pad 78 and is operative to pull air from the atmosphere through louvres 85 in a housing surrounding the evaporator system and through the filter pad 78. The air is in heat exchange relationship with the liquid effluent and is either heated or cooled by the effluent and is discharged into the individual toilet compartments 12 through a main conduit 86 and branch conduits 88. When the outside air is relatively warm, it is cooled as it is pulled through the filter pad 78. When the outside air is relatively cold, it is warmed as it is pulled through the filter pad. Thus, the compartments 12 are cooled in summer and warmed in winter. It is noted that the biological process in the tanks 44 and 46 does not generally take place at temperatures lower than about 50° F. and is optimized at temperatures of about 70° F. to about 80° F. A heater 90 is, therefore, located in the flush tank 16 and is operative to heat the effluent to a temperature within the range of 50° to 80° F. The heater 90 could be located in the evaporator system 20 or otherwise suitably located. In cold weather, the air pulled through the filter pad 78 is exposed to temperatures in the noted range and is heated before being discharged to the toilet compartments 12. The conditioned air discharged into the toilet compartments 12 flows through the vent louvres 92 in the doors 30 so that fresh air is circulated through the compartments to eliminate odors.

As the air is pulled through the filter pad some of the effluent, about one-third evaporates and is discharged along with the air into the compartments 12. Obviously the air discharged is somewhat humid due to the presence of the effluent. For reducing the moisture, a humidistat 93 may be located in one of the toilet compartments or, preferably, in the main discharge conduit 86 for sensing the humidity of the air and controlling the operation of a baffle 94 located in a vent 96 communicating with the atmosphere through the roof of the heat exchanger housing. Accordngly, fresh air is mixed with the humid air to control the humidity of the air discharged to the compartments. In addition another baffle 98 can be located in the main conduit 86 at its junction with an atmospheric discharge conduit 100 to control the amount of air discharged to the toilet compartments 12. Thus, the amount of air discharged to the compartments can be controlled.

The effluent pumped from the flush tank 16 to the filter pad 78 is relatively clean but the pad filters the effluent and also air pulled through the pad so that the air is not contaminated. If desired, however, a dispensing apparatus can be placed in the pipe 72 for depositing a disinfectant and/or a defoaming agent in effluent. Finally, a vent pipe arrangement 102 is preferably provided and can be located between the second digestion tank 46 and the atmosphere through the roof 22 of the module 10. Vent pipe 102 can include a fan to positively eliminate odors from the toilet.

Each toilet compartment 12 can be provided with a wash basin which can be supplied by water from a holding tank or, if convenient, from a city water system or well. Discharge from the wash basin can be stored in another holding tank for later pumping, can be recirculated to the original holding tank through a filter and disinfectant system or could be discharged into the flush tank 16. The module 10 could be provided with an electrical generating system or other power source to drive the pump, heater and any other associated devices such as lighting.

From the foregoing description of a preferred embodiment of the invention, it can be seen that the removal of excess effluent from a toilet system can be easily accomplished without providing sewer connections or pumping out holding tanks. Further, it can be seen that heating or cooling of the toilet compartments can easily be accomplished in an economical manner by using the effluent as a heat exchange medium for air discharged to the compartments. Obviously evaporator systems other than that disclosed herein could be utilized in accordance with this invention. Even further, it can be seen that odors can be positively eliminated by circulating the conditioned air through the compartments.

Another primary advantage of the invention results from the fact that the effluent flowing back to the flush tank 16 is aerated by the air pulled through the filter pad 78 by the blower 84. The aerated effluent is eventually discharged through the toilet bowl 38 during the flushing process and into the digestion tanks 44 and 46. The biological process performed by the aerobic bacteria in the tanks is enhanced by the aerated effluent.

It should be realized that in certain instances the heating or cooling of the toilet compartments may not be a particular requirement of the comfort station. In those instances, the conduits 86 and 88 need not be provided and the blower 84 could discharge air and excess effluent directly to the atmosphere to provide solely for effluent removal. Alternatively, the blower 84 could pull air through the vents 92, the compartments 12 and the conduits 86 and 88 for circulation and odor elimination purposes and could discharge the air across the filter pad 78 and to the atmosphere through the louvres 85 along with excess effluent. By way of other modification, it is noted that, if desired, the discharge pipe 82 from the evaporator system 20 can flow into the branch pipes 66 communicating with the bowls 38. With this arrangement, the control valve 62 would not control flow of the toilets and flushing would be accomplished with the discharge from the evaporator.

It should be obvious to one skilled in the art that various modifications and changes can be made to the preferred embodiment disclosed herein without departing from the true spirit and scope of the invention as recited in the appended claims.

We claim:

1. A self-contained comfort station including a building module having at least one toilet compartment therein, said toilet compartment including at least one toilet therein, means associated with said toilet for breaking down waste and paper to provide a relatively clean liquid effluent, a flush tank into which said effluent is discharged, evaporator means for removing excess effluent said evaporator means including means for filtering and aerating the effluent during evaporation, pump means operative to displace the effluent from said flush tank to said evaporator means when it is desired to remove excess effluent from said flush tank, control means for determining when excess effluent is present in said flush tank, and valve means responsive to said control means for directing the flow of effluent to said evaporator means when excess effluent is determined to be present in said flush tank by said control means.

2. A self-contained comfort station in accordance with claim 1 including duct means from said evaporator means to said toilet compartment, said evaporator means utilizing said effluent as a heat exchange medium for conditioning air and for discharging said conditioned air through said duct means to said toilet compartment.

3. A self-contained comfort station in accordance with claim 2 wherein said evaporator means includes control means for blending outside air with conditioned air for reducing the humidity of said conditioned air before it is discharged to said toilet compartment.

4. A self-contained comfort station in accordance with claim 2 wherein said evaporator means communicates with said flush tank so that aerated effluent is discharged back to said flush tank and is pumped therefrom to said toilet and back to said evaporator means.

5. A self-contained comfort station in accordance with claim 2 wherein said toilet compartment includes a vent opening so that conditioned air discharged into said compartment flows through said vent opening removing odors from said compartment.

6. A self-contained comfort station in accordance with claim 2 wherein said flush tank includes a heater mechanism for heating said effluent.

7. A self-contained comfort station in accordance with claim 1 wherein said module includes a plurality of toilet compartments therein and wherein each of said toilet compartments includes one of said toilets.

8. A self-contained comfort station in accordance with claim 7 wherein said toilet includes means for controlling the flow of the effluent thereto, said control means being responsive to use of said toilet to discontinue the flushing thereof.

9. A self-contained comfort station in accordance with claim 1 wherein said pump also discharges effluent from said flush tank to said toilet for flushing said toilets.

10. A self-contained comfort station in accordance with claim 9 wherein said toilet includes a toilet seat operatively connected to said control means.

11. A self-contained comfort station in accordanc with claim 1 wherein said modular structure is mounted on wheels and includes a hitch whereby said modular structure can be transported from one location to another.

12. A self-contained comfort station in accordance with claim 1 wherein said means for filtering and aerating said effluent includes depositing said effluent on said filter means and blower means for pulling ambient air through said filter means.

13. A self-contained comfort station in accordance with claim 12 wherein said blower means communicates with said toilet compartment.

14. A self-contained station in accordance with claim 1 including secondary storage tanks in communication with said flush tank whereby said secondary storage tanks are adapted to receive excess effluent from said flush tank.

15. A self-contained comfort station in accordance with claim 14 wherein said flush tank and said secondary storage tanks are integral.

16. A self-contained comfort station in accordance with claim 1 wherein said control means includes float means in said flush tank for determining the level of effluent therein.

* * * * *